Dec. 3, 1968    J. GLADER    3,414,663
GROUND CONNECTION FOR OUTLET BOXES
Filed April 7, 1967    2 Sheets-Sheet 1
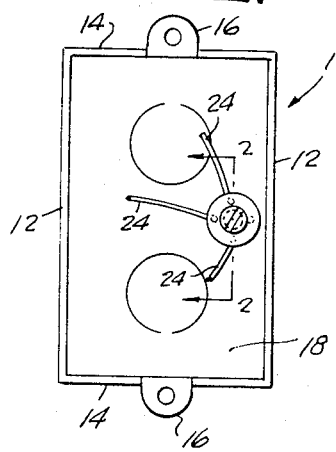
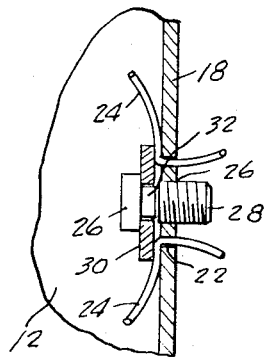
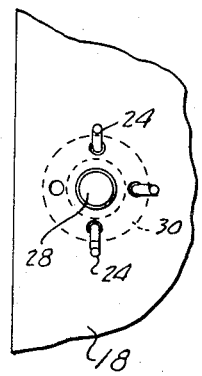
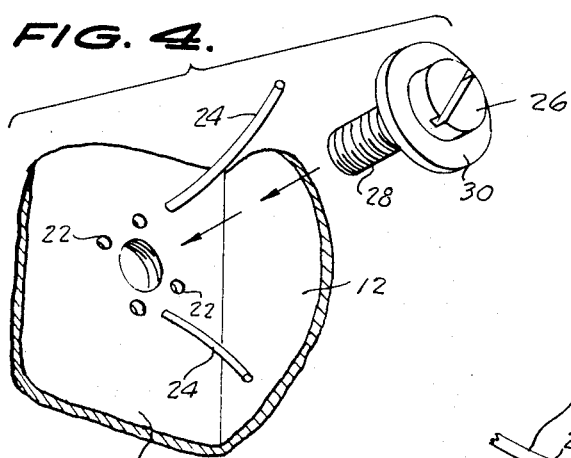
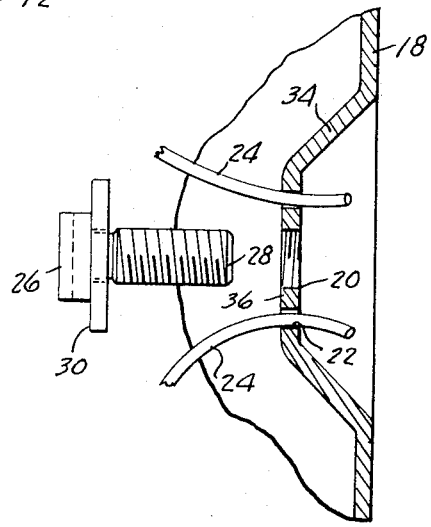
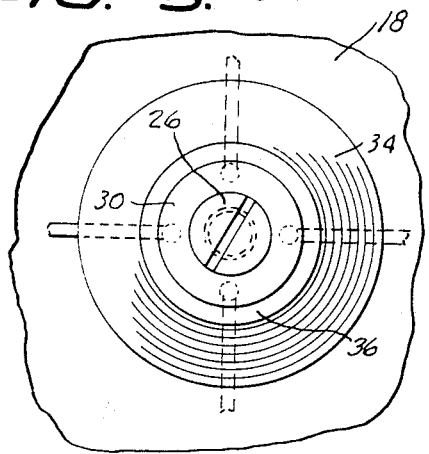
INVENTOR.
JAMES GLADER,
BY Berman, Davidson & Berman
ATTORNEYS.

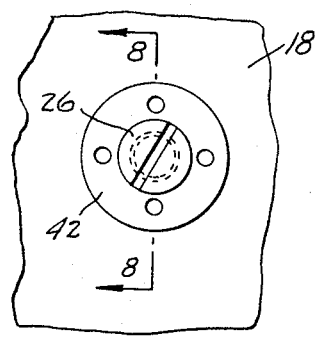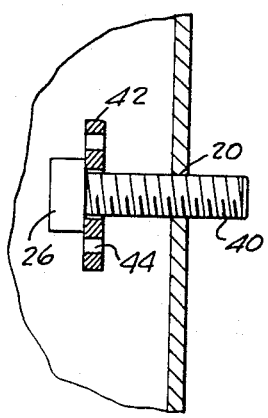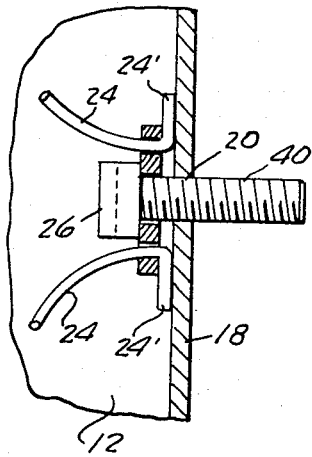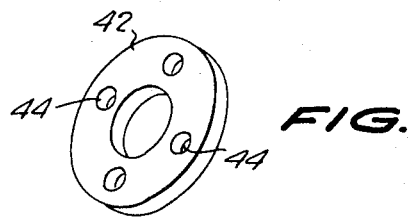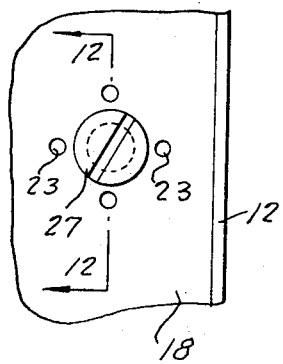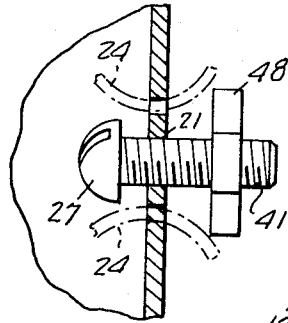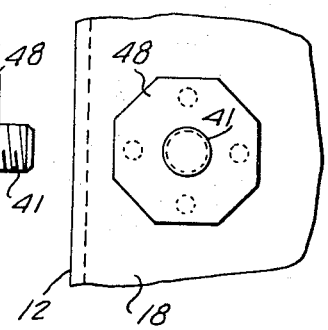

United States Patent Office 3,414,663
Patented Dec. 3, 1968

3,414,663
GROUND CONNECTION FOR OUTLET BOXES
James Glader, 1405 Park Lane,
Mobridge, S. Dak. 57601
Filed Apr. 7, 1967, Ser. No. 629,132
1 Claim. (Cl. 174—51)

ABSTRACT OF THE DISCLOSURE

A ground connection for outlet boxes including a tapped hole in the wall of an outlet box, a screw to enter the hole and plain holes adjacent the tapped hole to receive ground wires in position to be overlaid and secured by the screw head or by a washer mounted on the screw.

---

This invention relates to means for making ground connections in the wall to the conventional outlet box.

It is an object of this invention to provide means for making ground connections in a conventional outlet box which will involve only conventional elements, a minimum number of such elements, and a minimum of modification of the box itself.

It is a further object of this invention to provide the ground connection in a wall of a conventional outlet box in which a minimum of alteration is required by the manufacturer of the box and in which the connection can be completed by the purchase of a minimum of perfectly standard items.

It is a further object of this invention to provide an outlet box ground connection as aforesaid which will establish perfect electrical contact and will secure the same beyond any possibility of accidental loosening or removal.

The above and other objects will be made clear from the following detailed description taken in connection with the annexed drawings, in which:

FIGURE 1 is a plan view showing an outlet box with the improved connection;

FIGURE 2 is a section on the line 2—2 of FIGURE 1;

FIGURE 3 is an elevation looking from the right of FIGURE 2;

FIGURE 4 is an exploded view of the parts shown in FIGURES 1, 2 and 3;

FIGURE 5 is an elevation of another form of connection;

FIGURE 6 is an elevation of the parts shown in FIGURE 5 preparatory to making the full connection;

FIGURE 7 is an elevation of another form of connection;

FIGURE 8 is a section on the line 8—8 of FIGURE 7;

FIGURE 9 is a view similar to FIGURE 8, showing a connection as completed;

FIGURE 10 is a perspective view of the special washer used in FIGURES 7, 8 and 9;

FIGURE 11 is an elevation of still another form of connection;

FIGURE 12 is a section on the line 12—12 of FIGURE 11; and

FIGURE 13 is an elevation on the right-hand side of FIGURE 12.

The necessity for connecting "ground" wires to the switch boxes, junction boxes, and outlet boxes is well known and the prior art abounds with devices for making such connections. Most of such devices, however, have involved either rather elaborate reconstruction of the box itself or if a standard box be utilized, then quite elaborate attachments for such boxes. One thing is certain; the ground connection must be electrically positive when made and it must stay that way. This, the present invention, accomplishes with minimum modification of the standard box, with minimum additional parts, and with maximum simplicity in the acutal making of the ground connection. As used herein, the term "outlet box" shall include switch and junction boxes.

Referring now to FIGURES 1–4, an outlet junction box, of conventional type, is designated generally at 10. The box has the usual side walls 12, end walls 14, and securing ears 16 and a bottom wall 18. As best shown in FIGURE 4, the bottom wall 18 adjacent one of the side walls 12 has formed therein a threaded opening 20 surrounded by a plurality of punched or drilled holes 22. This represents the total extent of the modification of the box adapting it to use in this invention. Ground wires 24 are passed through one or more of the apertures 22 whereupon a screw having a head 26, a threaded shank 28, and a captive washer 30, is screwed into the tapped or threaded opening 20.

As best shown in FIGURE 2, the washer 30 rests in a groove 32 between the head 26 and the shank 28 and, therefore, is freely rotatable. When the shank 28 is threaded into the aperture 20, and brought down tight, as shown in FIGURE 2, the wires 24 are trapped between the washer 30 and the floor 18. The wires are not disturbed by the turning movement of the screw because the washer 30 is, as above noted, fairly rotatable. The electrical connection is positive and so is the mechanical connection. At the same time, unlike a conventional binding post, there is no possibility of the washer 30 twisting the wires out of position.

FIGURES 5 and 6 show a slight modification in the form of FIGURES 1–4, distinguished by the formation in the floor 18 of an inwardly protruding boss 34 having a planar top surface in which is formed a threaded aperture 20. This avoids external protuberance from the floor of the box.

A further modification is shown in FIGURES 7–10, in which there is an absolute minimum of alteration of the conventional box and the floor 18 has only the threaded aperture 20 which receives the shank 40 of a screw having a head 26. A washer 42 is freely slidable and rotatable on the shank 40 and contains a plurality of apertures 44 which receive ground wires 24. When the wires 24 have been passed through the apertures 23, free ends 24' are bent parallel to the floor 18. The shank 40 is threaded into the aperture 20 of the floor 18 and the parts are brought to the position shown in FIGURE 9. Both electrically and mechanically, the connection is positive and immovable.

Still another form is illustrated in FIGURES 11, 12 and 13. Here, the floor 18 has a plain aperture 21 which slidably receives the threaded shank 41 of a screw having a head 27. Apertures 23 are formed in the floor 18 adjacent the aperture 21. Wires 24 are passed through the apertures 23. The shank 41 is passed through the aperture 21 and a nut 48 is threaded onto the shank 41 and brought down to clamp the wires 24 between the nut 48 and the floor 18. Here again, the connection, both electrically and mechanically, is positive and immovable.

No doubt, other forms of this idea will suggest themselves to those skilled in the art. It is not, therefore, intended to limit this invention to the precise details disclosed herein but only as set forth in the subjoined claim.

I claim:

1. In combination: a flat, planar outlet box wall having a threaded aperture therethrough; a pattern of wire-receiving apertures penetrating said wall, said apertures being mutually equally spaced and being radially equally spaced about said threaded aperture; a headed screw engaging the threads of said aperture and a member rotatable on said screw and of sufficient diameter to overlie the pattern of said apertures, said member acting to clamp a wire passing through any of said apertures against said flat, planar wall.

References Cited

UNITED STATES PATENTS

| | | | |
|---|---|---|---|
| 507,403 | 10/1893 | Bell | 339—248 X |
| 1,649,937 | 11/1927 | Waltz | 24—125 |
| 1,813,448 | 7/1931 | Horton. | |
| 2,693,586 | 11/1954 | Dorfman et al. | 339—263 |

FOREIGN PATENTS

| | | |
|---|---|---|
| 809,826 | 8/1951 | Germany. |
| 308,888 | 4/1929 | Great Britain. |
| 393,544 | 6/1933 | Great Britain. |

LARAMIE E. ASKIN, *Primary Examiner.*